E. P. COUSINO.
BICYCLE TRAILER.
APPLICATION FILED NOV. 1, 1917.

1,263,381.

Patented Apr. 23, 1918.

INVENTOR
Elton P. Cousino

WITNESSES
W. C. Fielding
H. H. Babcock

BY
Richard Evans
ATTORNEY

UNITED STATES PATENT OFFICE.

ELTON P. COUSINO, OF NEWPORT, MICHIGAN.

BICYCLE-TRAILER.

1,263,381.　　　Specification of Letters Patent.　　Patented Apr. 23, 1918.

Application filed November 1, 1917. Serial No. 199,705.

*To all whom it may concern:*

Be it known that I, ELTON P. COUSINO, a citizen of the United States, residing at Newport, in the county of Monroe and State of Michigan, have invented certain new and useful Improvements in Bicycle-Trailers, of which the following is a specification.

This invention relates to trailers, and more particularly to a trailer specially adapted for use in connection with a bicycle.

One of the main objects of the invention is to provide a trailer having simple and efficient means for attaching the same to a bicycle. A further object is to provide a trailer and attaching means therefor so constructed as to permit easy turning of the bicycle. Another object is to provide simple and efficient means for resiliently securing the trailer to the axle of the back wheel of the bicycle so as to eliminate all unnecessary vibration. Further objects will appear from the detailed description.

Figure 1:
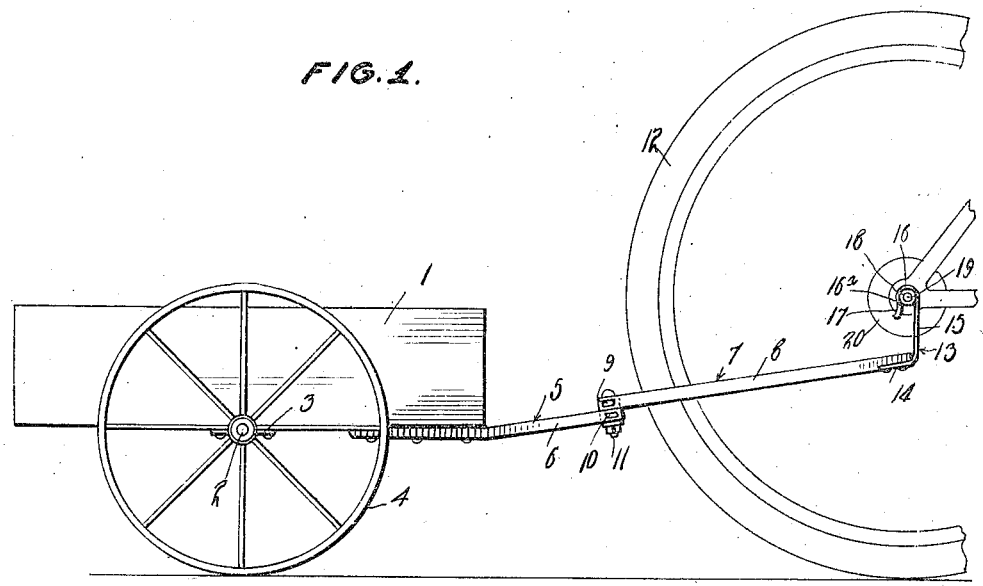
Figure 1 is a side view of a trailer constructed in accordance with my invention as applied.

The trailer is provided with a body 1 of the usual box-like construction at the center of the underface of which is secured a transverse axle 2 mounted in the bearing blocks 3 and provided at each end with a ground wheel 4. A yoke 5 is mounted at the forward end of body 1, the side arms 6 being directed rearwardly and projecting beneath the body to which they are secured in the usual manner. A yoke 7 is mounted above the yoke 5 and has its arms 8 directed forwardly. The cross bar 9 of this yoke rests upon the cross bar 10 of yoke 5, these two bars being pivotally secured together by a pivot bolt 11 secured through the same at the longitudinal center thereof. By this construction, the forward yoke 7 is free to turn about a vertical axis independently of the yoke 5.

Figure 2:
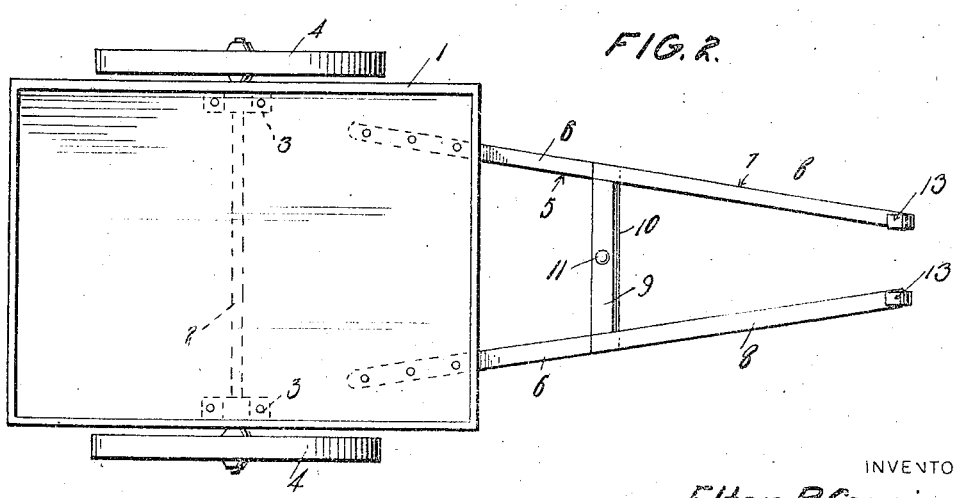
Fig. 2 is a top plan view of the same.

As will be noted from Fig. 2, the arms 5 of yoke 7 are forwardly convergent, the arms of the two yokes being in alinement when the trailer is being pulled straight forward. The forward ends of arms 8 of yoke 7 are spaced apart to receive between them the rear wheel 12 of a bicycle or similar vehicle. Each arm 8 is provided at its forward end with a securing member 13. This member is formed by bending from resilient strap material, being provided, at its lower end, with the arm 14 secured to the underface of arm 8 of the yoke 7. Securing arm 14 is formed integral with, and disposed substantially at a right angle to, the resilient shank 15 the upper end portion of which is turned downward and backward to provide a downwardly directed hook 16. The lower end of the bill 16ª of this hook is bent inward as at 17 to provide a restricted passage-way leading into the hook. This hook is adapted to fit tightly about the usual nut 18 which is secured on the axle 19 of the hub 20 of wheel 12, adjacent the side bar of the frame 21. The hooks 16 engage about the nuts 18 at each side of the wheel and thus serve to releasably secure the arms 8 of the yoke 7 to the same. Due to its pivotal connection to the yoke 6, yoke 7 is free to turn so as to permit the bicycle to be steered to either side. As the hooks 16 engage about the nuts 18, and as these nuts are secured on the axle 19 against rotation, the shanks 15 of the hooks provide resilient connections between the yoke and the axle which serve to absorb the vibration from the trailer, these shanks also acting to prevent sudden forward or rearward movement of the trailer and the consequent wear and tear on the bicycle.

There may be slight changes made in the construction and arrangement of the different parts of my invention without departing from the field and scope of the same, and I intend to include all such variations, as fall within the scope of the appended claims in this application in which a preferred form only of my invention is disclosed.

What I claim is:

1. In a bicycle trailer, a wheel mounted body, a yoke pivotally secured thereto for movement about a vertical axis and having its arms forwardly converging, and downwardly directed resilient hooks secured to the forward ends of said arms and adapted to engage about the axle of a bicycle wheel so as to detachably secure the arms thereto.

2. In a bicycle trailer, a wheel mounted body, a yoke pivotally secured thereto for movement about a vertical axis and having its arms forwardly converging, and fastening members secured to the forward ends of said arms, said members having upwardly extending resilient shanks and downwardly extending resilient hooks formed at the upper ends thereof and adapted to engage about the axle of a bicycle wheel so as to detachably secure the arms to the same.

3. In a bicycle trailer, a wheel mounted body, a yoke having its arms directed rearwardly and secured to said body, a second yoke having its arms forwardly converging and its cross bar mounted on the cross bar of the first yoke, the cross bars of the two said yokes being pivotally secured together for relative movement about a vertical axis, and fastening members secured to the forward ends of said arms, said members having upwardly extending resilient shanks and downwardly extending resilient hooks formed at the upper ends thereof and adapted to engage about the axle of a bicycle wheel so as to detachably secure the arms to the same.

4. In a bicycle trailer, a wheel mounted body, a yoke having its arms directed rearwardly and secured to said body, and fastening members secured to the forward ends of said arms, said members having upwardly extending resilient shanks and downwardly extending rearwardly directed hooks formed at the upper ends thereof, the lower end portion of the bill of each of said hooks being bent inward to provide a restricted passage-way into the hook.

In testimony whereof I affix my signature in presence of two witnesses.

ELTON P. COUSINO.

Witnesses:
THOMAS J. BARRETT,
CHESTER COUSINO.